United States Patent [19]

Newallis et al.

[11] 3,725,030
[45] Apr. 3, 1973

[54] LIMITING PLANT GROWTH WITH HETEROCYCLIC ALKYLTHIOCYANATE AND ISOTHIOCYANATE

[75] Inventors: Peter E. Newallis, Leawood, Kans.; Albert J. Poje, Grandview, Mo.; Peter F. Epstein, Prairie Village, Kans.

[73] Assignee: Chemagro Corporation, Kansas City, Mo.

[22] Filed: Nov. 20, 1970

[21] Appl. No.: 91,541

[52] U.S. Cl. .............................. 71/76, 71/73, 71/74, 71/75, 71/88, 71/90, 71/91, 71/94, 71/95, 71/96, 260/294.8 E, 260/294.8 G, 260/326.12 R, 260/326.9, 260/329 R, 260/332.1, 260/332.5, 260/345.1, 260/346.1, 260/346.2
[51] Int. Cl. ................................................ A01n 5/00
[58] Field of Search ........................... 71/76, 104, 88

[56] References Cited

UNITED STATES PATENTS

| | | | |
|---|---|---|---|
| 2,946,720 | 7/1960 | Lewis | 424/285 |
| 2,394,915 | 2/1946 | Jones | 71/104 |
| 2,642,353 | 6/1953 | Mowry et al. | 71/104 |
| 3,553,243 | 1/1971 | Hein | 71/104 |
| 2,929,702 | 3/1960 | Speziale | 71/88 |
| 3,393,209 | 7/1968 | Majewski | 71/88 |

FOREIGN PATENTS OR APPLICATIONS

| | | | |
|---|---|---|---|
| 539,263 | 4/1957 | Canada | 71/76 |

*Primary Examiner*—Lewis Gotts
*Assistant Examiner*—G. Hollrah
*Attorney*—Burgess, Dinklage & Sprung

[57] ABSTRACT

Plant growth limiting compositions and methods of limiting vegetative growth with non-phytotoxic concentrations using certain alkylthiocyanates and isothiocyanates.

5 Claims, No Drawings

LIMITING PLANT GROWTH WITH HETEROCYCLIC ALKYLTHIOCYANATE AND ISOTHIOCYANATE

It has been found in accordance with the present invention that the particular heterocyclic alkyl thiocyanates and heterocyclic alkyl isothiocyanates of the formulas:

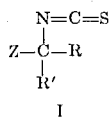 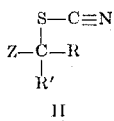

I          II

Wherein:

R and R' are each individually hydrogen or alkyl, and Z is furyl, dihydrofuryl, tetrahydrofuryl, benzofuryl, pyranyl, dihydropyranyl, tetrahydropyranyl, thienyl, pyridyl, pyrrolyl, picolyl, indolyl, dihydrothienyl-1 oxide, dihydrothienyl-1, 1-dioxide or tetrahydrothienyl-1-dioxide as well as alkyl, chloro, bromo, and nitro substitution products thereof, alkyl in all instances containing from one to five carbon atoms.

The present invention relates to and has for its objects the use as plant growth regulators, of certain heterocyclic (alkyl thiocyanates) and isothiocyanates, some of which are known as nematocides and flavoring agents, in the form of mixtures of such compounds in a new way especially for regulating the growth of vegetation with other and further objects becoming apparent from a study of the within specification.

It is known that some of the heterocyclic alkyl isothiocyanates of this invention can be used for the control of parasitic worms such as nematodes (U.S. Pat. No. 2,946,720) and as flavoring agents for food and beverages (U.S. Pat. No. 2,905,701). Other reports describing some of the compounds of this instant invention can be found in the following references: J. Am. Chem. Soc. *51*, 3131 (1920); Bull. Chem. Soc. Japan *33*, 1465 (1960); Anno *445*, 201 (1925); Bull Chem. Soc. Japan *36*, 108 (1963).

It has been found that in accordance with the present invention, the particular heterocyclic alkyl thiocyanates and heterocyclic alkyl isothiocyanates of the formulas:

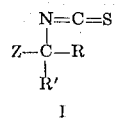 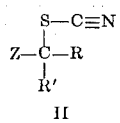

I          II

Wherein:

R and R' are each individually hydrogen or alkyl and Z is furyl, dihydrofuryl, tetrahydrofuryl, benzofuryl, pyranyl, dihydropyranyl, tetrahydropyranyl, thienyl, pyridyl, pyrrolyl, picolyl, indolyl, dihydrothienyl-1-oxide dihydrothienyl-1, 1-dioxide or tetrahydrothienyl-1-dioxide as well as alkyl, chloro, bromo, and nitro substitution products thereof, alkyl in all instances containing from one to five carbon atoms, possess plant growth-regulating properties.

It is very surprising then that some of the heterocyclic alkyl thiocyanates and heterocyclic alkyl isothiocyanates which are known as nematocides are also usable according to the present invention, having a high degree of growth regulating activity as well as a broad spectrum of such activity. Some of these compounds may be used in a new way for stunting the growth of monocotolydonous and dicotolydonous crop and weed plants, ornamentals, shrubs and trees. Selected compounds of this invention have a beneficial effect on crops such as soybeans and snapbeans by increasing the yield and/or protein content of such plants. Both alone and in synergistic combinations with maleic hydrazide, the compounds of this invention retard the growth of grasses and reduce the phytotoxic effects of maleic hydrazide when used alone at comparable rates. Some of the compounds of this invention can cause the formation of abscission layers of fruit or buds, so that the number of buds or fruit dropping from a plant and/or the ease of the dropping of such fruit may be regulated. Other types of beneficial effects on certain plants may be anticipated from the above described biological effects. These include the regulation of the setting of fruit of spermatophytic plants, increasing the resistance of plants to frost or drought damage, increasing the yield of sugar beets or cane, and their sugar content, causing defoliation of cotton with or without addition of commercial defoliants such as S,S,S,-tributyl phosphorotrithioate (DEF) or S,S,S,-tributyl phosphorotrithioite (FOLEX), and increasing the size of flowers and shape of ornamental plants, reduction of the undesirable growth of suckers for plants such as tobacco, inhibition of the sprouting of potatoes and breaking plant dormancy and similar such biological effects.

Since the known commercial plant growth regulators are generally members of chemical classes such as phosphonium and ammonium salts, amides or carboxylic acids, it was surprising that selected members from the classes set forth herein would exhibit a high degree of plant growth regulant activity. Furthermore, it was even more surprising to find that a few selected compounds of this class were outstandingly active, for example, tetrahydrofurfuryl isothiocyanate. It was further found that selected compounds from the classes when tested under field conditions produced not only desirable modifications in plant growth but economic benefits, such as yield increases. Thus, the active compounds of this invention represent a valuable enrichment of the art.

As examples of heterocyclic alkylthiocyanates and isothiocyanates which can be used according to this instant invention, the following compounds may be cited in particular:

(1) 2-Tetrahydrofurfuryl isothiocyanate
(2) 2-Furfuryl isothiocyanate
(3) 2-Isothiocyanato-3,4-dihydro-2H-pyran
(6) 2-Thenyl isothiocyanate
(7) 5-Chloro-2-thenyl isothiocyanate
(10) 2-Thenyl thiocyanate
(11) 5-Chloro-2-Thenyl thiocyanate
(12) 5-Bromo-2-thenyl thiocyanate
(13) 3-Thiocyanatomethyl 2,5-dihydrothiophene 1,1-dioxide
(15) 2-5-Dichloro-3-thenyl thiocyanate
(17) 5-Methyl-2-thenyl thiocyanate

(18) 2-(2-Furyl)-ethyl isothiocyanate
(19) 1-(2-Furyl)-ethyl isothiocyanate
(20) 2-Pyridylmethyl isothiocyanate
(21) 2-Benzofurfuryl isothiocyanate
(22) 2-Tetrahydrofurfuryl thiocyanate
(23) 1-Methyl-2-pyrrolemethyl isothiocyanate
(24) 1-Methyl-2-indolemethyl isothiocyanate
(25) 6-Methyl-2-picolyl isothiocyanate
(26) 2,5-Dichloro-3-thenyl isothiocyanate
(27) 2,5-Dibromo-3-thenyl isothiocyanate
(28) 2,3,5-Trichloro-4-thenyl isothiocyanate
(29) 2,5-Dimethyl-3-thenyl isothiocyanate
(30) 5-Nitrofurfuryl isothiocyanate
(31) 2,3-Dihydro-2-furfuryl isothiocyanate
(32) 3-thenyl thiocyanate
(33) 2,3-Dihydro-2-furfuryl isothiocyanate Some of the substances according to the present invention are new, although they can be manufactured simply by known methods. The compounds of this invention are obtained, for example, whenever the appropriate heterocyclic alkyl amine is reacted with carbon disulfide and a chloroformate at temperatures substantially between about −30° to +50°C but preferably between −10° to 30°C in the presence of a base selected from the group of inorganic bases such as sodium or potassium hydroxide or organic tertiary amines such as pyridine or triethylamine. With organic bases, it is optionally preferred to use inert solvents such as chloroform or dioxane.

Alternatively, some of the new and old compounds can be prepared by the isomerization of the corresponding thiocyanate, by heating them optionally in an inert solvent, preferably a dipolar aprotic solvent such as dimethyl formamide, sulfolane, acetonitrile and the like at temperatures substantially between about 30° to 180°C and optionally in the presence of a Lewis acid catalyst such as zinc chloride, boron trifluoride and the like.

Advantageously, the active compounds according to the present invention exhibit outstanding growth regulating properties with comparatively low toxicity to warm blooded creatures and concommittantly low phytotoxicity at the rates at which the compounds of this invention are applied. Hence, the instant compounds are suitable for use as plant growth regulating agents, for one or more of the above-mentioned purposes.

The active compounds according to the instant invention can be utilized, if desired, in the form of the usual formulations or compositions with diluents or extenders, i.e., dispersible carrier vehicles, such as solutions, emulsions, suspensions, emulsifiable concentrates, spray powders, pastes, soluble powders, dusting agents, granulates, etc. These are prepared in known manner, for instance by extending the active compounds with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (of Agricultural Chemicals, March 1960, pages 35–38). The following may be chiefly considered for use as carrier vehicles for this purpose: dispersible liquid diluent carriers, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.), and water; as well as dispersible finely divided solid carriers, such as ground natural minerals e.g., kaolins, alumina, silica, chalk, i.e., calcium carbonate, talc, kieselguhr, etc.) and ground synthetic minerals (e.g., highly dispersed silic acid, silicates, e.g., alkali silicates, etc.); whereas the following may be chiefly considered for use as carrier vehicle assistants, e.g., surface-active agents, for this purpose: emulsifying agents, such as nonionic and anionic emulsifying agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

Such active compounds may be employed alone or in the form of mixtures with one another and/or with such solid or liquid dispersible carrier vehicles and/or with other known compatible active agents, especially plant protection agents, such as fungicides, insecticides, bactericides, etc., if desired, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95 percent by weight of the mixture, whereas carrier composition mixtures suitable for direction application or field application generally contemplate those in which the active compound is present in an amount substantially between about 0.01–2.0 percent, preferably 0.01–0.8 percent, by weight of the mixture. Thus, the present invention contemplates overall compositions which comprise mixtures of a dispersible carrier vehicle such as (1) a dispersible carrier solid, or (2) a dispersible carrier liquid preferably including a carrier vehicle assistant, e.g., surface-active agent, and an amount of the active compound which is effective for the purpose in questions and in which is generally between about 0.01–95 percent by weight of the mixture.

Furthermore, the present invention contemplates controlling the rate of growth of plants, increasing their yield, protein content, sugar content, resistance to frost and drought damage or preventing the growth of undesirable suckers and other objects of this invention heretofore mentioned by applying to one of (a) such plants and (b) their habitat, an efficacious amount of the particular active compound of the invention alone or together with another active compound or with a carrier vehicle as noted above. The compounds of this invention can also be used to control the size and shape of vegetative portions of ornamental plants or their flowers. The instant formulations or compositions are applied in the usual manner, for example, by spraying, atomizing, scattering, dusting, watering, sprinkling and the like either to the soil around the plants, to the plants themselves or both.

It will be realized, of course, that in connection with the use of these compounds for influencing the growth of plants and/or affecting the other desirable results heretofore mentioned, the concentration of the particular active compound utilized in the admixture with the carrier vehicle will depend on the intended application and may be varied within a fairly wide range depending on weather conditions, the purpose for which the active compound is used and the plant species in which it is intended to produce the desired effect. Therefore, in special cases it is possible to go above or below the afore-mentioned concentration ranges The following examples illustrate, without limitation, the growth regulatory activity of the particular active compounds of the present invention.

Example I

Cucumber Root Test
Wettable powder base consisting of:
92 parts by weight hydrated silica (ultra fine, "Hi-Sil 233")
4 parts by weight sodium lignin sulfonate ("Marasperse N")
4 parts by weight polycondensate of ethylene oxide, propylene oxide and propylene glycol (mol. wt. about 1000) ("Pluronic L-61")

To produce a suitable preparation of the particular active compound, 1 part by weight of such active compound is mixed intimately with 1 part by weight of the stated wettable powder base. To prepare a 10,000 ppm. dilution, 0.4 grams of the resulting preparation is thoroughly mixed with 20 mls. of distilled water. The resulting dilution is further diluted with distilled water to the indicated final concentrations. Whatman No. 1 filter paper is placed in a 150 × 25 mm Petri dish, and 10 cucumber seeds are arranged on it in a row. The dish is then moistened with 7 mls. of the specified dilution of the particular active compound.

Treated dishes are incubated in darkness at 20°C.

Rating is determined on the basis of growth of the root during the period of 24 hours between the third and fourth day using average values for the 10 seeds. "0" to "9" scale rating is used to indicate the activity of potential growth regulators. A "0" scale reading indicates growth retardation within the range of 0–10 percent when compared with the control. A "9" scale reading corresponds to 90 percent or more growth retardation when compared with the control.

A "(0)" to "(9)" scale rating is used to indicate the activity of potential growth promotants. "(0)" indicates growth promotion within the range of 0–10 percent when compared with the control "(9)" indicates 90 percent or greater growth promotion when compared with the control.

The particular active compounds tested, the concentration thereof used and the results obtained can be seen from the following Table 1.

TABLE 1

| Active compound | Concentration (p.p.m.) | | |
|---|---|---|---|
| | 10,000 | 1,000 | 100 |
| (1) 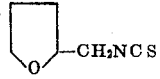 | 9 | 9 | 9 |
| (2) 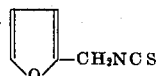 | 9 | 9 | 4 |
| (3)  | 9 | 5 | 2 |
| (4) 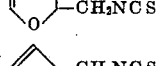 | 9 | 1 | (9) |
| (5) 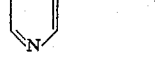 | 9 | 9 | 4 |
| (6) 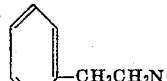 | 9 | 9 | 3 |
| (7)  | 9 | 9 | 4 |
| (8) 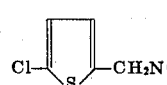 | 9 | 9 | 9 |
| (9) 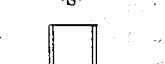 | 9 | 9 | 7 |
| (10) 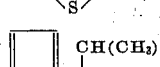 | 9 | 9 | 3 |
| (11)  | 9 | 9 | 4 |
| (12)  | 9 | 8 | 9 |
| (13) 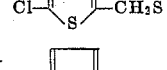 | 8 | 8 | 5 |
| (14) 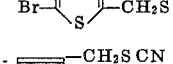 | 0 | 0 | (2) |
| (15) 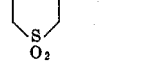 | 9 | 9 | 9 |
| (26) 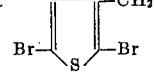 | 9 | 9 | 9 |
| (22)  | 9 | 9 | 8 |

EXAMPLE II

Snap Bean Foliar Spray Test

Wettable powder base consisting of:
  92 parts by weight hydrated silica (ultra fine, "Hi-Sil 233")
  4 parts by weight sodium lignin sulfonate ("Marasperse N")
  4 parts by weight polycondensate of ethylene oxide, propylene oxide and propylene glycol (mol. wt. about 1,000) ("Pluronic L-61")

To produce a suitable preparation of the particular active compound, 1 part by weight of such active compound is mixed intimately with 1 part by weight of the stated wettable powder base. To prepare a 10,000 ppm. dilution, 0.8 grams of the resulting preparation is thoroughly mixed with 40 mls. of distilled water containing 0.01 percent polyoxyethylene sorbitan monolaurate (Tween 20). The resulting dilution is further diluted with distilled water to the indicated final concentrations.

Snap bean plants, as soon as the primary leaves are relatively smooth (6–7 days old) and are capable of absorbing and translocating chemicals, are sprayed with the given compound at the indicated concentration until just dew moist. For each test 40 mls. of the appropriate compound dilution are sprayed on four plants in an area of 5 square feet.

Treated plants are moved to the greenhouse and are left for 10 to 14 days. The degree of growth response is determined by measuring three parameters: total plant height, length of second node to appex, and petiol length of the first trifoliate leaves.

A "0" to "9" scale reading is used to express the degree of growth response. A "0" scale reading indicates growth retardation within the range of 0 to 10 percent when compared with the control. A "9" scale reading corresponds to 90 percent or more growth retardation.

The particular active compounds tested, the concentration thereof used and the results obtained can be seen from the following Table 2.

TABLE 2

| Active compound | Concentration (p.p.m.) | | | | | | | | |
|---|---|---|---|---|---|---|---|---|---|
| | 10,000 | | | 1,000 | | | 100 | | |
| | A | B | C | A | B | C | A | B | C |
| (1) 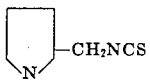 | 2 | 4 | 3 | 1 | 1 | 1 | 1 | 1 | 2 |
| (13) 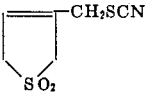 | 3 | 4 | 1 | 3 | 4 | 2 | 1 | 1 | 2 |

In this table, the letters A, B and C, refer respectively to total plant height, length of second node to apex, and petiol length of the first trifoliate leaves.

EXAMPLE III

Soybean Yield Test
  Solvent: 9.5 ml. of water containing 0.01 percent by weight of polyoxyethylene sorbitan monolaurate (Tween 20)

To produce a suitable preparation of the particular active compound, 0.5 g. of such active compound is mixed with the stated amount of solvent, and the resulting solution is then further diluted with such solvent to provide the rates of application indicated below in ppm.

Soybean plants of the variety Clark 63 were used as test plants, and were sprayed with the particular active compound preparation at a rate of 92.625 decalitres per hectare, at a time when less than 5 percent of the flowers were in bloom. The treatments were arranged by plots in a randomized block design and replicated 3 times. The control plots received no treatment.

The degree of efficacy of the particular active compound was determined by weighing the soybeans harvested from the treated and untreated plots and expressing the results as a percentage of weight of treated to weight of untreated harvested soybeans. The plant height in the treated plots, when compared with the untreated check plots, was also included in the evaluation.

The particular active compound tested, the rates of application and the results obtained can be seen from the following Table 3.

TABLE 3.—SOYBEAN YIELD TEST

| Compound | P.p.m. of active compound applied | Percent increase of soybean yield | Average plant height (cm). |
|---|---|---|---|
| (1) 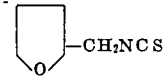 | 500 | 16 | 108 |
| Same as above | 100 | 27 | 113 |
| Control (untreated) | 0 | 0 | 108 |

EXAMPLE IV

Snapbean Yield Test
  Solvent: 9.5 ml of water containing 0.01 percent by weight of polyoxyethylene sorbitan monolaurate (Tween 20)

To produce a suitable preparation of the particular active compound, 0.5 g of such active compound is mixed with the stated amount of solvent, and the resulting solution is then further diluted with such solvent to provide the rate of application indicated below in ppm.

Plots of snap bean plants, when 5 to 10 percent of the flowers were in bloom, were sprayed with the particular active compound preparation at a rate of 92.625 decaliters per hectare. The control plots received no treatment.

At harvest time the fresh weight of fruit from the treated and untreated plots were determined. The yield of the treated plots was expressed as a percentage of the yield from the untreated control plots.

The particular active compound tested, the rate of application and the results obtained can be seen from the following Table 4.

TABLE 4.—SNAPBEAN YIELD TEST

| Compound | P.p.m. of active compound applied | Percent increase of snap bean yield |
|---|---|---|
| (1) 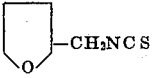 | 62.5 | 11 |
| Control | 0 | 0 |

EXAMPLE V

Chemical Mowing of Kentucky Bluegrass
Solvent: 9.5 ml of water containing 0.01 percent by weight of polyoxyethylene sorbitan monolaurate (Tween 20)

To produce a suitable preparation of the particular active compound, 0.5 g of such active compound is mixed with the stated amount of solvent, and the resulting solution is then further diluted with such solvent to provide the rates of application indicated below in ppm.

Growing bluegrass sod was sprayed with the particular active compound at the concentrations indicated. Plots were arranged in a randomized block design with 3 replications. The plots were mowed to a uniform height of 5 centimeters before spraying, sprayed and then left for 5 weeks before readings were taken.

The degree of efficacy of the particular active compound was evaluated by weighing a clipping from a 30 × 30 cm. area at a height of 2.45 cm. from the ground to determine the foliage yield from each plot.

The particular active compound tested, the rates of application and the results obtained can be seen from the following Table 5.

TABLE 5.—CHEMICAL MOWING OF KENTUCKY BLUEGRASS

| Compound | P.p.m. of active compound applied | Average fresh green weight of the clippings (g.) |
|---|---|---|
| (1) 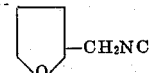 | 5,000 | 50.7 |
| Same as above | 500 | 40.0 |
| do | 50 | 83.5 |
| Control | 0 | 67.1 |

EXAMPLE VI

Chemical Mowing of Kentucky Fescue
Solvent: 9.5 ml of water containing 0.01 percent by weight of polyoxyethylene sorbitan monolaurate (Tween 20).

To produce a suitable preparation of the particular active compound, 0.5 g. of such active compound is mixed with the stated amount of solvent, and the resulting solution is then further diluted with such solvent to provide the rates of application indicated below in ppm.

Growing fescue grass sod was sprayed with the particular active compound at the concentrations indicated. Plots were arranged in a randomized block design with three replications. The plots were mowed to a uniform height of 5 centimeters before spraying, sprayed and then left for 8 weeks before readings were taken.

The degree of efficacy of the particular active compound was evaluated by weighing a clipping from a 30 × 30 cm. area at a height of 2.45 cm. from the ground to determine the foliage yield from each plot.

The particular active compound tested, the rates of application and the results obtained can be seen from the following Table 6.

TABLE 6.—CHEMICAL MOWING OF KENTUCKY FESCUE

| Compound | Concentrations (p.p.m.) | Average fresh green weight of the clippings (g.) | Visual ratings |
|---|---|---|---|
| (1) 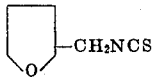 | 5,000 | 87.1 | 0 |
| Same as above | 1,000 | 85.3 | 10 |
| Control | 0 | 103.2 | 0 |

EXAMPLE VII

Chemical Pruning of Elm Trees
Solvent: 9.5 ml of water containing 0.01 percent by weight of polyoxyethylene sorbitan monolaurate (Tween 20)

To produce a suitable preparation of the particular active compound, 0.5 g. of such active compound is mixed with the stated amount of solvent, and the resulting solution is then further diluted with such solvent to provide the rates of application indicated below in ppm. This preparation of the mixture of the particular active compound with maleic hydrazide (MH-30) was made by mixing together one part by weight of the given active compound and 3 parts by weight of maleic hydrazide, mixing 0.5 g. of the resulting mixture with the stated amount of solvent, and then further diluting it with such solvent to provide the rates of application indicated below in ppm.

3-year-old American Elm trees were used as test plants. The treatments were applied on 2 limbs per tree and replicated 3 times. The retardation of twig growth was determined by measuring the length of a twig 17 weeks after treatment and comparing it to the length of the same twig before treatment. The average difference in growth between each of the six treated limbs and six untreated control limbs is calculated as a percentage of the average growth of the control limbs, and the result expressed as percent inhibition of growth of the untreated twigs.

The particular active compound tested, the rates of application and the results obtained can be seen from the following Table 7.

TABLE 7.—CHEMICAL PRUNING OF ELM TREES

| Compound | Total p.p.m. of active compounds applied | Percentage inhibition of growth treated twigs |
|---|---|---|
| (1) 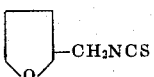 | 2,500 | 8 |
| Same as above | 500 | 10 |
| Same as above | 100 | 52 |
| Same as above plus maleic hydrazide | 5,000 | 65 |
| do | 1,000 | 61 |
| do | 500 | 22 |
| Maleic hydrazide | 5,000 | 37 |
| do | 1,000 | 39 |
| do | 500 | 40 |
| Control | 0 | 00 |

EXAMPLE VIII

Peach Fruit Thinning Test

Solvent: 9.5 ml of water containing 0.01 percent by weight of polyoxyethylene sorbitan monolaurate (Tween 20)

To produce a suitable preparation of the particular active compound, 0.5 g. of such active compound is mixed with the stated amount of solvent, and the resulting solution is then further diluted with such solvent to provide the rates of application indicated below in ppm.

Ten-year-old Redhaven peach trees were used as test plants, and single limbs of these trees were sprayed with the given active compound preparation at a rate of 277.785 decaliters per hectare 5 days after full bloom. Each treatment was replicated 3 times and each replicate was on separate trees. The control plots received no treatment.

The degree of efficacy of the particular active compound was determined by comparing the number of fruit blossoms remaining on the treated limbs at hand thinning time with the number of flowers per untreated limb, it being known that a tree will bear larger fruit where there are fewer total fruit to be supported. It is also known that thinning the fruit from a tree one can affect the alternate bearing habits of the fruit trees to give a more consistent yield year after year rather than alternating heavy and little or no yield of fruit in alternate years.

The particular active compound tested, the rates of application and the results obtained can be seen from the following Table 8.

TABLE 8.—PEACH FRUIT-THINNING TEST

| Compound | P.p.m. of active compound applied | Percent fruit thinning over the control |
|---|---|---|
| (1) 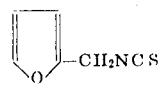—CH$_2$NCS | 5,000 | 16 |
| Same as above | 500 | 26 |
| do | 50 | 11 |

The following further examples and Table of Compounds illustrate, without limitation, a number of heterocylic alkyl isothiocyanates usable in accordance with the present invention.

EXAMPLE IX (2) 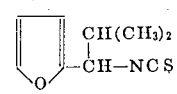—CH$_2$NCS

A mixture of 50 g. (0.515 mole) of furfuryl amine and 50 g. (0.5 mole) triethyl amine was dissolved in 70 ml. of dioxane and cooled to −10°C. To this mixture was added 40 g. (0.525 mole) of carbon disulfide and the reaction mixture was allowed to warm to room temperature. Ethyl chloroformate, 57 g. (0.53 mole), was added dropwise followed by the addition of 200 ml. of chloroform and an additional 50 g. (0.5 mole) of triethylamine. The reaction mixture was stirred at room temperature for 60 hours, the solid was filtered and the organic solution was washed with water. After evaporation of the solvent, the residue was dried by azeotroping with benzene. Distillation gave 19 g. of colorless liquid. b.p. 52°–54°C (0.9mm). Calc. for C, 51.8; H, 4.3; N, 10.1; found, C, 51.8; H, 3.9; N, 10.0.

The reactions involved are as follows:

Step I

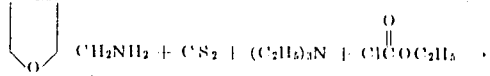

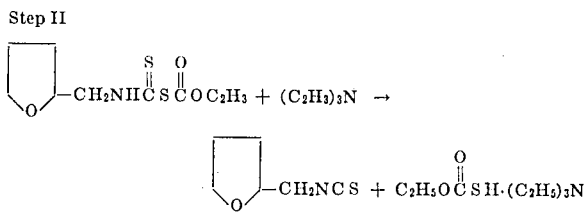

Step II

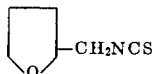

In the corresponding manner there are obtained:

| Compound | Physical properties |
|---|---|
| (1) 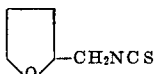 | 61° C. (0.5 mm.). |
| (3)  | 63° C. (0.3 mm.). |
| (4) 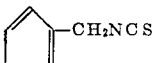 | 112° C. (1.5 mm.). |
| (4)  | 93° C. (0.45 mm.). |

EXAMPLE X (9)

$$\text{<image: furan with CH(CH}_3\text{)}_2 \text{ and CH—NCS>}$$

To a solution of 27 g. (0.193 mole) of α-isopropyl 2-furyl carbinol in 80 ml. of pyridine was added with cooling 22 g. (0.193 mole) of methane sulfonyl chloride over a one hour period. After standing overnight, the solid mass was dried in an oven at 50°C and dissolved in 60 mls. of acetone. To this solution was added 30 g. (0.3 mole) of potassium thiocyanate and the reaction mixture was refluxed for 3 hours. After filtration and removal of the solvent by evaporation, the resultant oil was extracted with 500 mls. of methylene chloride, washed with water, dried over anhydrous magnesium sulfate and filtered. Removal of the solvent by evaporation, left 30 g of residual oil which was twice distilled to give 6 g. (17 percent of α-isopropyl-2-furfuryl isothiocyanate, pale yellow liquid distilling at 48°C (0.07 mm).

The reactions involved are as follows:

Step I

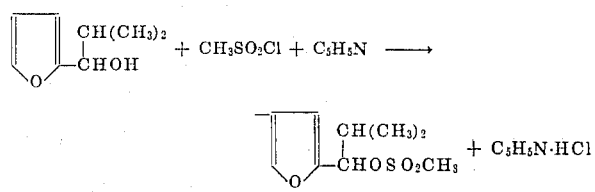

Step II

A mixture of 12.8 grams (0.08 mole) of 2-thenyl thiocyanate and 0.5 gram of zinc chloride in 25 mls. of dimethylformamide was heated at 80° for 3 hours. The reaction mixture was cooled, poured into water and the organic layer was extracted with benzene and then heptane. The combined extracts were washed with water, dried over anhydrous sodium sulfate, filtered and the solvent removed under reduced pressure. The residue was distilled giving 6.1 grams (48 percent) of 2-thenyl isothiocyanate, b.p. 65°C (0.06 mm).

In the corresponding manner there are obtained:

| Compound | Physical Properties |
| --- | --- |
| (7) Cl—[thiophene]—CH₂NCS | B.p. 82° C.(0.05 mm.). |
| (8) Br—[thiophene]—CH₂NCS | B.p. 92–96° C.(0.04 mm.). |
| (26) Cl—[thiophene]—Cl, CH₂NCS | B.p. 105° C. (0.03 mm.). |

EXAMPLE XI

(10) [furan]—CH₂SCN

To a solution of 19.4 g. (0.2 mole) of potassium thiocyanate in 250 ml of acetone was added 19.9 g. (0.15 mole) of 2-thenyl chloride. After the addition was complete, the mixture was heated under reflux for 1 hour and allowed to cool at room temperature. The acetone was removed under reduced pressure and the residue was dissolved in a mixture of methylene chloride and water. The methylene chloride layer was separated and was dried over sodium sulfate. A yellow oil was obtained on distillation of the dried organic layer. Distillation of this oil gave 19.7 grams of 2-thenyl thiocyanate (87 percent) boiling at 77°C(0.05 mm), $n_D^{30} = 1.5984$.

In the corresponding manner there are obtained:

| Compound | Physical properties |
| --- | --- |
| (11) Cl—[thiophene]—CH₂SCN | B.p. 83° C.(0.05 mm.). |
| (12) Br—[thiophene]—CH₂SCN | Yellow oil. |
| (13) [thiophene-SO₂]—CH₂SCN | M.p. 135–138° C. |
| (14) Br—[thiophene]—Br, CH₂SCN | M.p. 75–77° C. |
| (22) [furan]—CH₂SCN | B.p. 58° C.(0.05) mm. |

EXAMPLE XII (6) [thiophene]—CH₂NCS

It will be realized by the artisan that all of the foregoing compounds contemplated by the present invention possess some degree of growth regulating properties. It will be further appreciated that the instant specification examples are set forth by the way of illustration and not limitation, and that various modifications and changes may be made without departing from the spirit and scope of the present invention which is to be limited only by the scope of the appended claims.

What is claimed is:

1. The method of retarding the growth of plants which comprises applying to such plants a growth retarding amount of a compound of the formula:

$$\begin{array}{cc} \mathrm{N{=}C{=}S} & \mathrm{S{-}C{\equiv}N} \\ | & | \\ \mathrm{Z{-}C{-}R} \quad \text{or} \quad \mathrm{Z{-}C{-}R} \\ | & | \\ \mathrm{R'} & \mathrm{R'} \end{array}$$

wherein:

R and R' are each individually hydrogen or alkyl and, Z is furyl, dihydrofuryl, tetrahydrofuryl, benzofuryl, pyranyl, dihydropyranyl, tetrahydropyranyl, as well as alkyl, chloro, bromo, and nitro substitution products thereof, alkyl in all instances containing from one to five carbon atoms.

2. Method according to claim 1 wherein Z is furyl or pyranyl as well as di- and tetra-hydrogenated derivatives thereof, optionally substituted with chlorine or bromine.

3. Method according to claim 1 wherein such compound is: 2-tetrahydrofurfuryl isothiocyanate of the formula:

(1) [tetrahydrofuran]—CH₂NCS

4. Method according to claim 1 wherein such compound is: 2-furfuryl isothiocyanate of the formula:

(2) [furan]—CH₂NCS

5. Method according to claim 1 wherein such compound is: 2-Isothiocyanato-3,4-dihydro-2H-pyran of the formula:
(3) 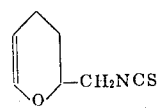
* * * * *